United States Patent [19]

Buluschek et al.

[11] 4,299,362
[45] Nov. 10, 1981

[54] SUPPORTING STRUCTURE FOR MULTICABLE-CONTAINING ELONGATED TRAY

[75] Inventors: Bruno Buluschek, Fallanden; Walter Magerli, Trimbach; Erich Müller, Aarburg, all of Switzerland

[73] Assignee: H. Heer & Co., Olten, Switzerland

[21] Appl. No.: 123,749

[22] Filed: Feb. 22, 1980

[30] Foreign Application Priority Data

Feb. 26, 1979 [CH] Switzerland .................. 1865/79

[51] Int. Cl.³ .................. F16L 3/00; F16L 3/22; H02G 3/04
[52] U.S. Cl. .................. 248/49; 248/235; 248/250
[58] Field of Search .......... 248/49, 235, 239, 240, 248/247, 248, 250; 211/90, 135, 153

[56] References Cited

U.S. PATENT DOCUMENTS

| | | | |
|---|---|---|---|
| 945,428 | 1/1910 | Wendt | 248/235 |
| 3,127,146 | 3/1964 | Fisher | 248/250 |
| 3,185,426 | 5/1965 | Bjerke | 248/250 |
| 3,948,473 | 4/1976 | Mason | 248/49 |
| 4,232,845 | 11/1980 | Turner | 248/49 |

*Primary Examiner*—James A. Leppink
*Attorney, Agent, or Firm*—Watson, Cole, Grindle & Watson

[57] ABSTRACT

A supporting structure for an elongated tray, such as a trough or rack, which is used to contain and support a multiplicity of cables running through a building, includes an elongated arm member which extends transversely beneath the tray, one end of the elongated arm member being connectable to a building wall or to a ceiling-strut suspended from a ceiling, and an elongated axial power strut which has one end connected to the elongated arm member near the end connectable to a building wall or ceiling-strut and the other end connected to the floor of the tray, the strut extending so as to enclose an angle of preferably 45° with the elongated arm member.

17 Claims, 5 Drawing Figures

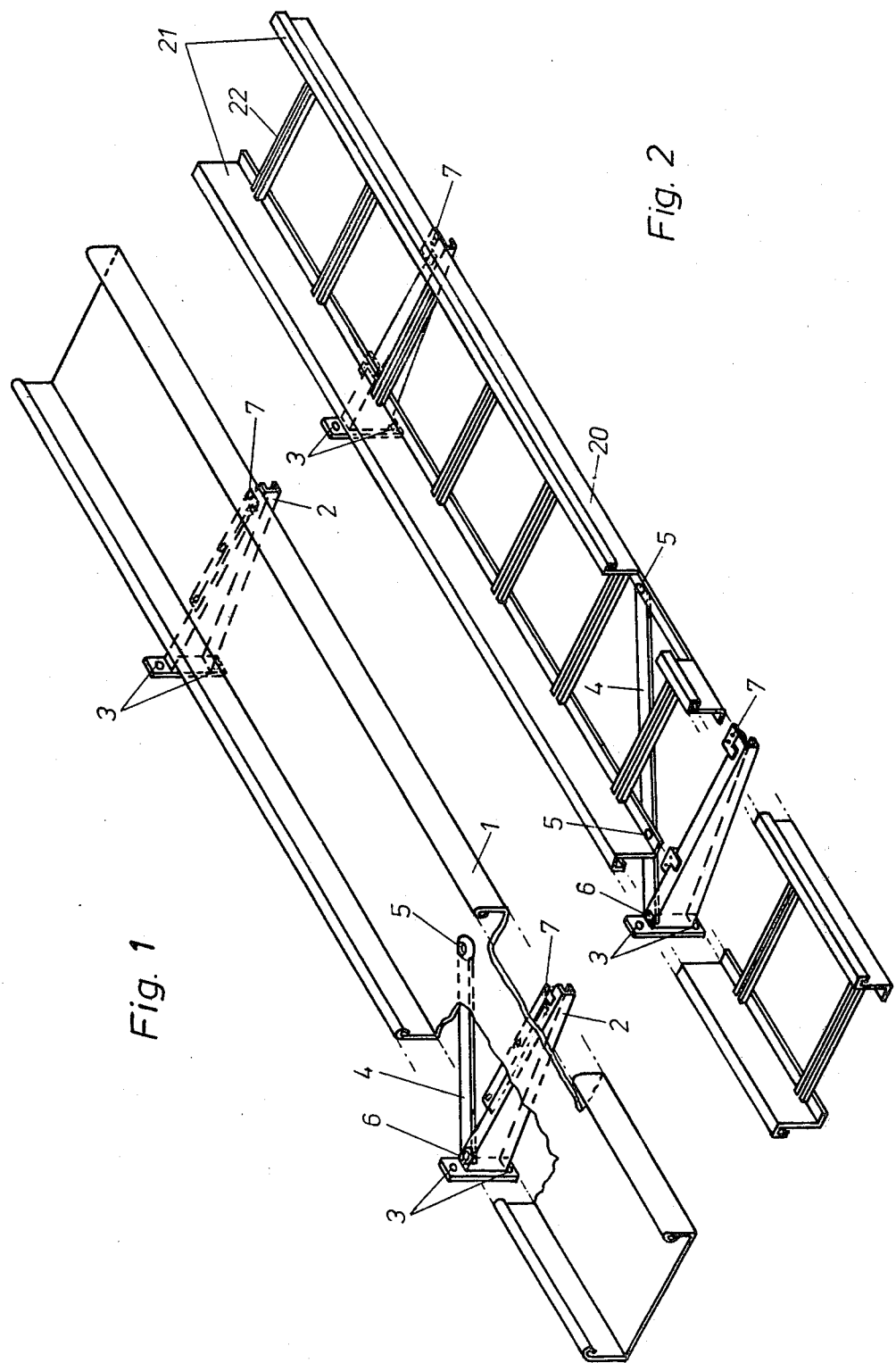

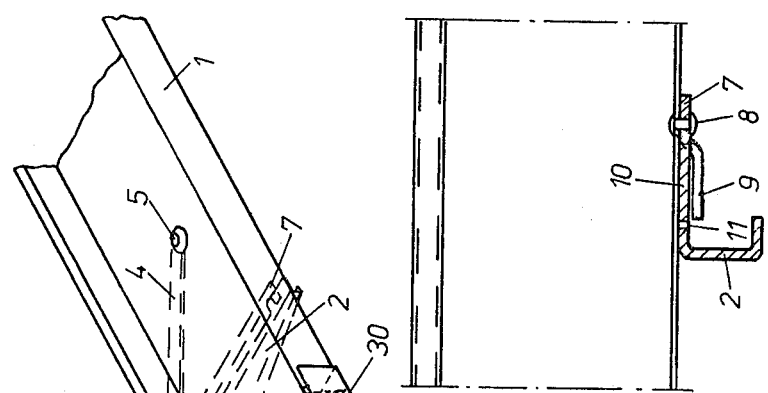
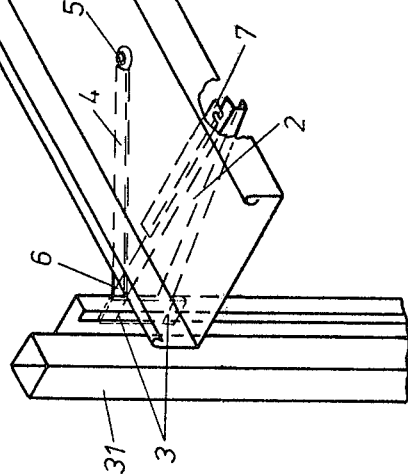
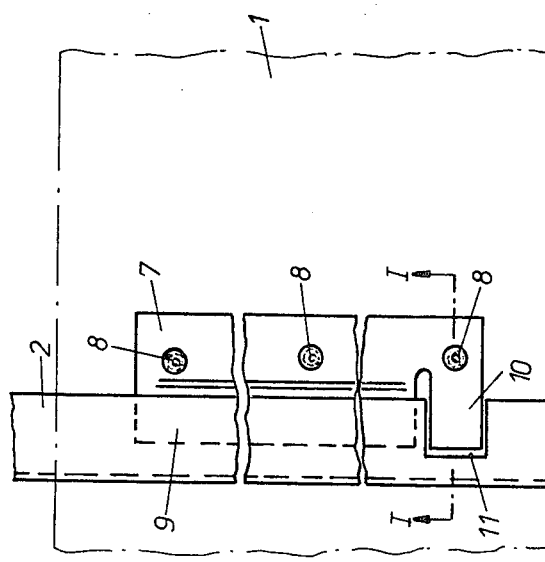

SUPPORTING STRUCTURE FOR MULTICABLE-CONTAINING ELONGATED TRAY

BACKGROUND OF THE INVENTION

The present invention is directed to supporting structures which are capable of mounting cable-supporting trays on the walls or ceilings of a building, and more specifically to supporting structures which when functionally interconnected with the cable-supporting trays will form units which can withstand the forces created by longitudinal, vertical and transverse movements of the trays relative to the supporting structures.

THE PRIOR ART

During the course of constructing buildings, and especially when the buildings are to be used as industrial plants, elongated cable-supporting trays are utilized to contain and support the multiplicity of cables that must run through the building, e.g., electrical cables, communication cables, etc. Such trays not only allow the cables to be placed in a compact side-by-side relationship which reduces possible damage thereto, but the use of such trays also reduces the number of individual supporting devices which must be used, i.e., instead of needing to use a separate supporting device for each cable at periodic intervals, only one or two supporting devices need to be used to mount each multicable-containing elongated tray to the adjacent wall or ceiling.

In some localities, buildings must comply with very strict building codes, for example, localities where earthquakes are a danger. This can be especially true when the buildings are to be used to house certain industrial processes. These codes may specify, for example, that the trays used to contain and support the cables which run through the building be suitably supported so as to remain in place under the highest of expected loads, either longitudinal, vertical or transverse, which may be applied thereto, e.g., during an earthquake. At the same time, the trays must be supported so as to allow for thermal expansions thereof since they might be exposed, either continuously or intermittently or purposefully or by accident, to very high temperatures. If provisions for thermal expansions of the trays are not made, heat-induced elongations of any two adjacent trays of the multiplicity of trays which form the entire length of the containment and support means for the cables could create damaging deformations and destructive internal stresses in each tray.

Thus it has long been desired to design supporting structures for a cable-containing tray which can be placed under the trays and attached to a wall or ceiling, and which can both withstand the movements of the trays created by, e.g., an earthquake, and also provide for thermal expansions of the individual trays. The problem is that these requirements are for the most part conflicting in nature.

It is known that the problem of thermal expansion can be controlled by mounting the cable-supporting trays so as to provide an expansion gap between the ends of the adjacent trays. Thus, connecting elements can be mounted between the ends of the adjacent trays and in slidable cooperation with each so that the ends of the trays will remain mounted on the connecting elements regardless of either tray's length. However, in order to provide resistance to movements of the trays caused, e.g., by earthquakes, it is also necessary to attach each tray in an immovable fashion to at least one elongated support arm positioned thereunder (this arm being connected at one end to a building wall or ceiling). A second elongated support arm can be positioned under the tray at a spaced apart point from the first elongated support arm, but this second elongated arm will not be fixedly attached to the tray since it must allow for free sliding of the tray thereover due to thermal expansions.

When the elongated cable-supporting trays are subjected to powerful longitudinal displacements, large moment forces will be applied to the individual support arms which are rigidly connected beneath the individual trays. Thus, each such elongated support arm must be constructed to be very strong and generally quite massive. This is especially true when the elongated support arm is to be attached to a portion extending from a vertically oriented strut attached to a building ceiling and several such arms are attached to the extending portion to create a layering of trays, one on top of the other. The requirement for strong and massive elongated support arms, however, results in increased material and labor costs.

It is an object of the present invention to provide a supporting structure for an elongated cable-supporting tray which can absorb all the forces created by various movements of the tray, including longitudinal, vertical and transverse, which forces may for example be created during an earthquake, yet be less massive and less costly to produce than prior art supporting devices.

SUMMARY OF THE INVENTION

According to the present invention, at least one supporting structure used to mount a cable-supporting tray to a building wall or ceiling comprises an elongated arm member which is capable of extending transversely beneath the cable-supporting tray, one end of the elongated arm member being itself connectable to a building wall or ceiling, the supporting structure also including an axial power strut which is connected at one end near the end of the elongated arm member that is connectable to a building wall and which is connectable at its opposite end to the floor of the tray, the strut being connectable to the floor of the tray so as to enclose an angle of preferably 45° with the elongated arm member, this angle being located in an imaginary plane which both passes through the strut and the elongated arm member and which is parallel to a plane passing through the floor of the supported cable-supporting tray. This axial power strut acts to transfer longitudinal movements of the supported elongated tray to the elongated arm member thereunder; however, by connecting the strut between the elongated tray and the elongated arm member as described, the moment of force acting on the end of the elongated arm member connected to the wall or ceiling-strut will be greatly reduced (as compared to the moment which would be created if the tray were rigidly connected to the elongated arm member along the length of the elongated arm member), and thus the elongated arm member can be made less massive in size and less costly to produce than prior art supporting devices.

When the elongated cable-supporting tray is in the form of an elongated trough, the axial power strut will be attached to the underside of the trough at the longitudinal center line, thereof, i.e., at a point midway across the transverse dimension of the floor of the trough. When the elongated cable-supporting tray is in the form of an elongated rack composed of parallel spaced apart spars and interconnecting transverse cross braces, the axial power strut will be sufficiently long to be suitable attached to the underside of both spaced apart spars.

The inventive supporting structure also includes at least one elongated strip element which is attachable to the underside of the tray, each strip element including a flat extension section which will extend parallel to the floor of the tray and a flat finger portion. An upper leg portion of the elongated arm member, which is advantageously constructed to have a C-shaped cross-section, will fit within the space defined between the floor of the tray and the flat extension section of each strip element to thus transmit forces created by vertical movements of the tray to the elongated arm member (vertical, that is, when the elongated arm member is horizontally oriented) and prevent separation of the tray from the elongated arm member. The flat finger portion of each strip element will fit within a corresponding cut-out portion in the upper leg portion of the elongated arm member to transmit forces created by transverse movements of the tray to the elongated arm member (i.e., along the longitudinal dimension of the elongated arm member). A sufficient gap is left between the tip of the flat finger portion of each elongated strip element and the base of the corresponding cut-out portion in the upper leg portion of the elongated arm member to allow a play of longitudinal movement of the tray along the elongated arm member.

The invention will now be better understood by reference to the accompanying drawings and the following detailed discussion.

DESCRIPTION OF THE DRAWINGS

In the drawings,

FIG. 1 depicts a schematic perspective view, partially broken away of an elongated cable-supporting trough, the trough being mounted on two spaced apart support structures constructed in accordance with the present invention, each support structure being mountable on a building wall;

FIG. 2 shows a schematic perspective view, partially broken away, of an elongated cable-supporting rack, the rack being mounted on two spaced apart support structures constructed in accordance with the present invention, each support structure being mountable on a building wall;

FIG. 3 depicts a schematic perspective view of two elongated cable-supporting troughs positioned in tandem, one trough having a small broken away portion, the troughs being separately mounted on support structures constructed in accordance with the present invention, each support structure being mounted on a ceiling spar;

FIG. 4 shows an enlarged schematic top view of a portion of a support structure used to support the trough in FIG. 1, the floor portion of the trough being indicated by broken lines, and FIG. 5 depicts a schematic cross-sectional view of the support structure according to the present invention as seen along line I—I of FIG. 4.

DETAILED DESCRIPTION OF THE PREFERRED EMBODIMENTS

As can be seen in FIG. 1, a typical elongated cable-supporting tray is in the form of an elongated trough 1 which includes spaced apart side walls and a generally flat floor portion 1a. The elongated trough 1 is shown mounted on two spaced apart support structures 2a and 2b which are each constructed in accordance with the present invention.

Each support structure 2a and 2b includes an elongated arm member 2c which is positioned to extend generally transversely across the width of the floor portion of the elongated trough 1 mounted thereon, and each elongated arm member 2c is constructed to have two parallel leg portions interconnected by a transverse bridge portion. These portions form a generally C-shaped configuration, i.e., when the elongated arm member is viewed about its longitudinal dimension from right to left in FIG. 1, to form an upper leg portion, a lower leg portion and a bridge portion connected therebetween. The bridge portion of each elongated arm member decreases in width as it extends from one end of the elongated arm member to the other (from left to right in FIG. 1), thus resulting in an overall tapering in the size of the elongated arm member from one end to the other. In FIG. 1, the largest end of each support structure is fixedly connected, for example by welding, to a mounting plate which is itself mountable on a wall (not shown) by means of screws 3. The upper legs of neither elongated support member 2a nor 2b are rigidly interconnected with the floor portion of the elongated trough 1.

The support structure 2a is constructed to include an elongated axial power strut 4 which has one end attached to the upper leg portion of the elongated arm member 2c at a point near the mounting plate, e.g., by means of a screw 6, and the opposite end attached to the underside of the floor portion 1a of the trough 1 at a point on the longitudinal center line thereof, e.g., by means of a screw 5. The connection of elongated strut 4 to the trough 1 is chosen so as to create an enclosed angle of about 45° with the elongated arm member 2c, i.e., in an imaginary plane passing through these elements which is parallel to a plane defined by the flat floor portion 1a of trough 1. The elongated strut 4 acts to transmit forces created by movement of the trough along the longitudinal direction thereof to the elongated arm member positioned therebelow at a point near the mounting plate, such that the moment acting on the mounting plate (this being the connecting point between the support structure and the wall is reduced to about 10% of the amount that would be applied to the mounting plate were the trough rigidly attached to the elongated arm member.

According to the FIG. 1 embodiment, each individual trough of the many troughs which, when mounted in tandem, can be used to support great lengths of the cables, is mounted on one support structure 2a which includes an elongated strut 4 attached thereto such that the forces created by the longitudinal movement of the trough can be transmitted to the elongated arm member 2c therebelow at a point near the mounting plate. The other support structure 2b advantageously used to support the trough 1 may not include a strut 4.

In order to prevent the trough 1 from moving to any great extent either vertically with respect to either elongated arm member 2c or transversely with respect thereto (in other words, along the longitudinal dimension of each elongated arm member 2c), elongated strip elements 7 are fixedly attached to the underside of the floor portion 1a of the trough 1, i.e., so as to extend generally transversely across the underside of the floor portion of the trough and at a location where they can be in operative engagement with the respective elongated arm members 2c of support structures 2a and 2b located therebelow. As shown in FIG. 4, each strip element 7 can be attached to the underside of the floor portion 1a of the trough 1 by means of spaced apart rivets 8. As shown in FIG. 5, each elongated strip element 7 includes an elongated portion which itself includes a bent portion 9a which extends downwardly from the underside of the floor portion of the trough 1, and a flat extension section 9b which extends generally parallel to an imaginary plane formed by the floor portion of the trough. The upper leg of the elongated arm member 2c of the associated support structure 2a or 2b will fit, with some play left, between the extension portion 9b of the strip element 7 and the underside of the floor portion 1a of the trough 1. This structural interrelationship will allow for the force created by substantial vertical movements of the trough 1 away from the elongated arm member 2c to be transmitted to the elongated arm member, i.e., by abutment of extension portion 9b of the strip element 7 attached to the elongated trough against the inside of the upper leg portion of the elongated arm member 2c.

Each strip element 7 also includes a generally flat finger portion 10 which is constructed so as to lie flat against the underside of the floor portion of the trough, this flat finger fitting, with some play left, within a corresponding cut-out portion in the upper leg of the associated elongated arm member, such that when the trough is substantially moved transversely (i.e., along the longitudinal dimension of the associated elongated arm member) the force of this movement will be transmitted to the elongated arm member, i.e., due to abutment between the sides of the flat finger portion 10 of each strip element 7 and the side walls of the cut-out portion in the upper leg of the associated elongated arm member. At the same time, each cut-out portion and each finger portion 10 are so shaped that gap 11 is provided between the tip of the finger portion 10 and the base of the cut-out portion. Such a gap may be, e.g., at least 2 mm.

Turning now to the embodiment of the invention shown in FIG. 2, a cable-supporting tray is shown to be in the form of an elongated rack 20 which is mounted on two spaced apart support structures constructed in accordance with the present invention. Each support structure includes an elongated arm member positioned to extend generally transversely across the width of the rack, the rack being formed of two parallel spaced apart spars 21 which are interconnected by cross braces 22. Each support structure is similar to the corresponding support structure shown in FIG. 1, except that the strut 4 of the left-hand support structure extends all the way to the furthest spar 21 and is suitably fixedly attached to both spars 21 by means of screws 5. In addition, instead of utilizing one strip element 7 in association with each elongated arm member, separate strip members 7 of reduced size are attached to the respective spars, each strip member 7 including an extension portion 9a, 9b (not shown) and a flat finger portion 10 (cooperable with corresponding spaced apart cut-out portions in the upper leg of each associated elongated arm member) to transmit to each elongated support member forces created by either the vertical or transverse movement of the rack 20. As in the situation shown in FIG. 1, the elongated strut 4 is connected to the spars 21 so as to enclose an angle of preferably 45° with the elongated arm member, i.e., in an imaginary plane passing through these elements which is parallel to a plane defined by the bottoms of the two parallel spars 21.

As shown in FIG. 3, when multiple troughs are lined up in tandem, they are mounted so as to leave an expansion gap between the adjacent trough ends, and these gaps are bridged by means of connecting elements 30 which allow for relative sliding movement of the troughs therein. In this embodiment, each trough is shown mounted near the expansion gap on only a single support structure 2a, with each support structure including an axial power strut 4 connected between the floor portion of the elongated trough at the longitudinal center line thereof and the elongated arm member as in the FIG. 1 embodiments. However, the supporting structures, instead of requiring mounting plates for attaching the elongated arm members to a wall, are attached to extending portions of ceiling struts 31, (which are suspended from a building ceiling). The elongated arm members are directly attached to the extending portions of the ceiling struts by means of screws extending through holes located in the bridge portions of the elongated arm members.

Several troughs can be attached to the extending portions of the ceiling struts 31 so as to create a layer-like result, one trough being attached above another.

Although certain preferred embodiments of the present invention have been described, it is obvious that various changes and modifications to the described structures can be made by those of ordinary skill in the art and still fall within the scope of the appended claims.

We claim:

1. A support structure for attaching an elongated cable-supporting tray to a wall or ceiling of a building, the cable-supporting tray including a floor portion which defines a plane therethrough, the support structure comprising an elongated arm member which is positionable beneath the floor portion of the elongated cable-supporting tray so as to extend generally transversely of the longitudinal dimension thereof, one end of said elongated arm member being connectable to a building wall or ceiling, and a strut element, one end of said strut element being connected to said elongated arm member near the end thereof connectable to a building wall or ceiling and the opposite end being connected to the floor portion of the supported elongated cable-supporting tray, said strut element being connectable to the floor portion of the supported elongated cable-supporting tray so as to enclose an angle with the elongated arm member in an imaginary plane passing through the strut element and the elongated arm member and which is parallel to said plane passing through the floor portion of the supported elongated cable-supporting tray, said strut being capable of transmitting forces created by the movements of the supported elongated cable-supporting tray along the longitudinal dimension thereof to said elongated arm member at a point near the end thereof connectable to a building wall or ceiling.

2. The support structure as defined in claim 1, wherein said strut element is connectable to the floor portion of the supported elongated cable-supporting device so as to enclose an angle of 45° with the elongated arm member.

3. The support structure as defined in claim 1, wherein said opposite end of said strut element which is connectable to the floor portion of the supported elongated cable-supporting tray includes a hole therein through which a screw is positionable to connect said opposite end of said strut element to the floor portion of the supported elongated cable-supporting tray.

4. The support structure as defined in claim 3, wherein said elongated cable-supporting tray is in the form of an elongated trough having a flat floor portion, and wherein said strut element is connectable to the underside of said flat floor portion at or near the longitudinal center line thereof.

5. The support structure as defined in claim 3 wherein said elongated cable-supporting tray is in the form of an elongated rack having two parallel elongated spars and transverse struts interconnected therebetween, wherein said strut element is sufficiently long to be connected to the elongated spar positioned furthest from said one end of said elongated arm member connectable to a building wall or ceiling, and wherein said strut element includes another hole therein through which another screw is positionable to connect said strut element to the elongated spar positioned closest to said one end of said elongated arm member connectable to a building wall or ceiling.

6. The support structure as defined in claim 1, wherein said one end of said elongated arm member connectable to a building wall or ceiling is fixedly attached to a mounting plate which includes holes therein through which screws may pass to mount said elongated arm member on a building wall.

7. The support structure as defined in claim 1, wherein said one end of said elongated arm member connectable to a building wall or ceiling includes holes therein through which screws may pass to mount said elongated arm member directly to an extending portion of a ceiling strut.

8. The support structure as defined in claim 1, wherein said elongated arm member has a C-shaped cross-section when viewed along the longitudinal dimension thereof so as to define an upper leg portion, a lower leg portion and an interconnecting transverse bridge portion, wherein said upper leg portion includes at least one cut-out area therein, and wherein said support structure includes at least one elongated strip element which is fixedly attachable to the floor portion of the cable-supporting tray, each said elongated strip element having a depending portion and a flat finger portion, said depending portion comprising a bent section and a flat section which extends parallel to the plane formed by the floor portion of the cable-supporting device, said flat finger portion being dimensioned so as to fit within a cut-out area in the upper leg portion of said elongated arm member, each said elongated strip member being fixedly connectable to the underside of the floor portion of the cable-supporting tray such that a portion of the upper leg portion of the elongated arm member will fit between said flat section of said elongated strip element and the floor portion of said cable-supporting tray and said flat finger portion of said elongated strip element will fit within a cut-out area in said upper leg portion of said elongated arm member, thus leaving some play, for forces of both vertical and transverse movements of said elongated cable-supporting tray being transferred to said elongated arm member.

9. An apparatus for supporting cables within a building, said support apparatus including an elongated cable-supporting tray, said tray including a floor portion which defines a plane therethrough, an elongated arm member which is positioned beneath said floor portion of the elongated cable-supporting tray so as to extend generally transversely of the longitudinal dimension thereof, one end of said elongated arm member being connectable to a building wall or ceiling, and a strut element, one end of said strut element being connected to said elongated arm member near the end thereof connectable to a building wall or ceiling and the opposite end being connected to the floor portion of the elongated cable-supporting tray so as to enclose an angle with the elongated arm member in an imaginary plane passing through the strut element and the elongated arm member and which is parallel to said plane passing through the floor portion of the tray, said strut functioning to transmit forces created by movements of the supported elongated cable-supporting tray along the longitudinal dimension thereof to said elongated arm member at a point near the end thereof connectable to a building wall or ceiling.

10. An apparatus as defined in claim 9, wherein said strut element is connected to the floor portion of the supported elongated cable-supporting device so as to enclose an angle of 45° with the elongated arm member.

11. The apparatus as defined in claim 9, wherein said opposite end of said strut element which is connected to the floor portion of the supported elongated cable-supporting tray includes a hole therein through which a screw is positioned by which said opposite end of said strut element is connected to the floor portion of the supported elongated cable-supporting tray.

12. The apparatus as defined in claim 11, wherein said elongated cable-supporting tray is in the form of an elongated trough having a flat floor portion, and wherein said strut element is connected to the underside of said flat floor portion at or near the longitudinal center line thereof.

13. The apparatus as defined in claim 11, wherein said elongated cable-supporting tray is in the form of an elongated rack having two parallel elongated spars and transverse struts interconnected therebetween, wherein said strut element of sufficient length is connected to the elongated spar positioned furthest from said one end of said elongated arm member connectable to a building wall or ceiling, and wherein said strut element includes another hole therein through which another screw is positioned by which said strut element is connected to the elongated spar positioned closest to said one end of said elongated arm member connectable to a building wall or ceiling.

14. The apparatus as defined in claim 9, wherein said one end of said elongated arm member connectable to a building wall or ceiling is fixedly attached to a mounting plate which includes holes therein through which screws may pass to mount said elongated arm member on a building wall.

15. The apparatus as defined in claim 9, wherein said one end of said elongated arm member connectable to a building wall or ceiling includes holes therein through which screws may pass to mount said elongated arm member directly to an extending portion of a ceiling strut.

16. The apparatus as defined in claim 9, wherein said elongated arm member has a C-shaped cross-section when viewed along the longitudinal dimension thereof so as to define an upper leg portion, a lower leg portion and an interconnecting transverse bridge portion, wherein said upper leg portion includes at least one cut-out area therein, and wherein said apparatus includes at least one elongated strip element which is fixedly attached to the floor portion of the cable-supporting tray, each said elongated strip element having a depending portion and a flat finger portion, said depending portion comprising a bent section and a flat section which extends parallel to the plane formed by the floor portion of the cable-supporting device, said flat finger portion being dimensioned so as to fit within a cut-out area in the upper leg portion of said elongated arm member, each said elongated strip member being fixedly connected to the underside of the floor portion of the cable-supporting tray such that a portion of the upper leg portion of the elongated arm member fits between said flat section of said elongated strip element and the floor portion of said cable-supporting tray and said tray finger portion of said elongated strip element fits within a cut-out area in said upper leg portion of said elongated arm member, thus leaving some play, for forces of both vertical and transverse movements of said elongated cable-supporting tray being transferred to said elongated arm member.

17. A support system for cables within a building, said support system comprising a multiplicity of apparatus as defined in claim 9 aligned in tandem, the end of each elongated cable-supporting tray being spaced from the adjacent end of the next tray so as to leave an expansion gap therebetween.

* * * * *